United States Patent [19]

Takeda et al.

[11] Patent Number: 4,943,874
[45] Date of Patent: Jul. 24, 1990

[54] TAPE TENSION CONTROLLER FOR A CASSETTE RECORDING/PLAYBACK APPARATUS

[75] Inventors: Hidekazu Takeda, Katuta; Kyuichirou Nagai, Fujisawa; Kenji Ogiro, Yokohama; Mitsuji Aman, Mito; Kouhei Takita, Yokohama, all of Japan

[73] Assignee: Hitachi, Ltd., Tokyo, Japan

[21] Appl. No.: 258,103

[22] Filed: Oct. 12, 1988

Related U.S. Application Data

[63] Continuation-in-part of Ser. No. 930,353, Nov. 13, 1986, abandoned.

[30] Foreign Application Priority Data

Nov. 13, 1985 [JP] Japan .................................. 60-252874

[51] Int. Cl.$^5$ ............................................. G11B 15/32
[52] U.S. Cl. .................................... 360/85; 360/74.3; 360/95; 242/200
[58] Field of Search ...................... 360/85, 84, 95, 71, 360/74.3; 242/200

[56] References Cited

U.S. PATENT DOCUMENTS

| 4,614,315 | 9/1986 | Gerrits et al. ...................... 242/200 |
| 4,642,706 | 2/1987 | Vollmann et al. ................. 360/74.3 |
| 4,730,225 | 3/1988 | Kishimoto et al. ............... 360/95 X |
| 4,797,760 | 1/1989 | Rademacher et al. ........... 360/85 X |
| 4,837,646 | 6/1989 | Nagai et al. ............................ 360/85 |

FOREIGN PATENT DOCUMENTS 57-86161  5/1982  Japan .
62-121949  6/1987  Japan ................................ 360/74.3

Primary Examiner—John H. Wolff
Attorney, Agent, or Firm—Fay, Sharpe, Beall, Fagan, Minnich & McKee

[57] ABSTRACT

In a magnetic video tape recorder of the cassette type with a tape tension controller comprising a tension detection arm one end of which contacts with one surface of a magnetic tape drawn from the cassette in order to detect the change of the tension in the magnetic tape there is provided a pair of roller pins each is positioned at each side of the detection arm and contacts another surface of the magnetic tape. Since the magnetic tape is turned down with an acute angle at one end of the detecting area, the detecting arm can fully detect the change of the tension.

7 Claims, 7 Drawing Sheets

FIG. 4
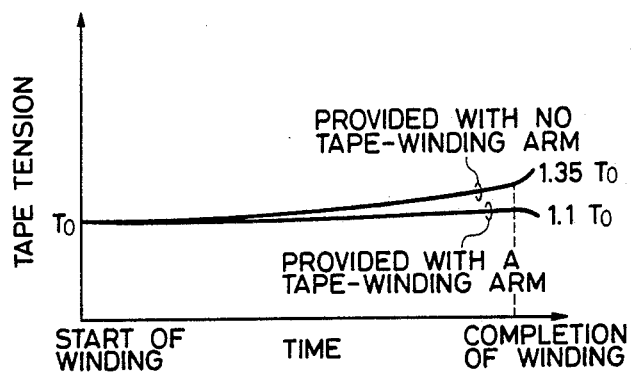
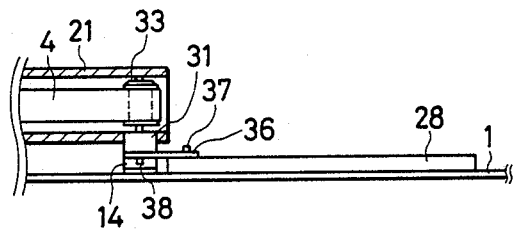
FIG. 5(a)
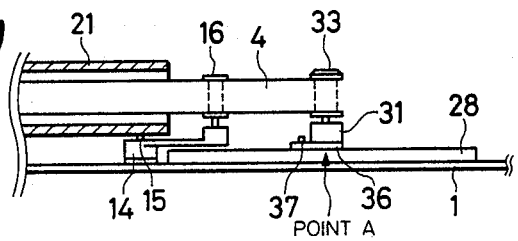
FIG. 5(b)
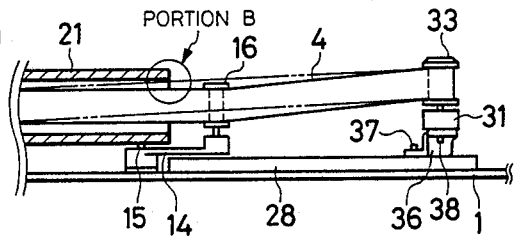
FIG. 5(c)

TAPE TENSION CONTROLLER FOR A CASSETTE RECORDING/PLAYBACK APPARATUS

This application is a continuation-in-part of application Ser. No. 930,353, filed Nov. 13, 1986 now abandoned.

FIELD OF THE INVENTION

The present invention relates to a tape tension-controlling device for a magnetic recording and reproducing apparatus, and more particularly to a tape tension-controlling arm having a tape guide for a magnetic tape wound in a cassette that prevents contact between the tape and the cassette opening when the tape is loaded onto a rotary cylinder.

BACKGROUND OF THE INVENTION

In recent years, there has been a demand for improved performance in various aspects of magnetic recording and reproducing apparatuses and enhanced functions thereof in conjunction with the increased demand for such apparatuses including VTR's. Particularly in the case of VTR's, the control of tape tension and improvement in its control characteristics have been major tasks necessitated by the desire to ensure that a magnetic head is provided with optimum head touch.

A known form of tape tension-controlling device has a tape tension-detecting pin disposed at a tip portion thereof and is equipped with a tension-detecting arm which is displaced with the center of a tension arm acting as a supporting center in response to variations in the tape tension experienced by a magnetic tape, thereby controlling tape tension at the time when the magnetic tape wound in a cassette is loaded onto a rotary cylinder via a tape guide.

The tape tension-detecting pin of this tension-detecting arm abuts against the magnetic surface side of the magnetic tape. However, since the magnetic tape cannot be wound sufficiently in the process of a loading-operation, i.e., since the magnetic tape cannot retain a sufficient winding angle with respect to the tape tension-detecting pin, the tension-detecting pin cannot sensitively read variations in tape tension. Thus, no consideration has been given to providing sufficient tape tension-controlling characteristics, i.e., to the fact that a control effect cannot be sufficiently obtained with respect to increased tension (tension drift) from the start to the end of tape winding on reels (refer to the official gazette of Japanese Patent Laid-Open No. 86161/1982).

In addition, for instance, in the case of an upward loading of a tape onto the entrance side of the rotary cylinder, or in a case where the tape tension varies and the tape tension-detecting pin consequently moves to the left and the right, there is a possibility of tape contact with a cassette wall proximate to a tape draw-out port of the cassette, thereby causing damage to the magnetic tape, unless a post for restricting the tape-traveling position is provided at a portion of the tape tension-detecting pin adjacent to the cassette in the traveling direction of the tape.

SUMMARY OF THE INVENTION

The object of the present invention is to provide a tape tension-controlling device for a magnetic recording and reproducing apparatus which has improved tape tension-controlling characteristics, thereby overcoming the drawbacks of the prior art.

A tape tension-controlling device for a magnetic recording and reproducing apparatus in accordance with the present invention is arranged as follows. A tape tension-controlling device for a magnetic recording and reproducing apparatus has a tension-detecting arm, one end of which is supported rotatably on the side of a main chassis and in which a detecting portion provided at the other end thereof comes into contact with the magnetic surface of a magnetic tape drawn out from a supply-side reel of a cassette and is adapted to be displaced in response to variations in tape tension applied to the magnetic tape. The device also has a tension-applying band, in which a band portion with one end thereof coupled with the tension-detecting arm and the other end thereof coupled with the side of the main chassis is wound around a reel base of the supply-side reel for applying an adjustable force onto the reel base in response to the displacement of the tension-detecting arm, so as to control tape tension at the time of loading the magnetic tape wound in the cassette onto a rotary cylinder via a tape guide body. The device further comprises a tape-winding arm, one end of which is supported rotatably on the side of the main chassis, that increases the winding angle of the magnetic tape at the detecting portion of the tension-detecting arm as positioning is carried out with a tape guide means provided at the other end thereof abutting against the magnetic tape, at a position closer to the supply-side reel rather than the detecting portion of the tension-detecting arm, at the time when the magnetic tape is drawn out from the supply-side reel and loaded by means of the tape guide means.

Certain ideas underlying the development of the present invention are noted below parenthetically.

The arrangement of a tape tension-controlling device for a magnetic recording and reproducing apparatus in accordance with the present invention is such that a tape-winding arm for winding a magnetic tape at a predetermined wide range of angle is provided at a tape tension-detecting portion disposed at one end of a tension-detecting arm.

The effect of improvement of the tension-controlling characteristics as a result of increasing the angle at which the tape is wound onto the tape tension-detecting portion can be theoretically clarified from static analysis of a balance between forces acting on the tension-detecting arm and a reel base of the supply-side reel of the cassette.

For instance, the relationship between the tape tension T at the tape tension-detecting portion, i.e., the tape tension-detecting pin, and other parameters can be expressed by the following formula (1) using a balance between forces acting on the reel base of the supply-side reel and the tension-detecting arm:

$$T \approx \frac{R_1 F_0 l_3}{l_1 \cos(\alpha - \beta) R_1 - l_4 \cos\left|\beta - \frac{\pi}{2}\right| R_1 + f(e^{\mu_1 \theta}) l_2 R} \quad (1)$$

where each of the parameters is set as follows, and descriptions given in the parentheses are based on reference numerals employed in FIG. 1.

T: tape tension $l_1$: length of the rotary arm of the tape tension-detecting portion (dimension in the y direction between a support shaft 6 and the tape tension-detecting pin 7)

$l_2$: length of a rotary arm for fitting a tension-applying band (dimension between the support shaft 6 and a support pin 11)

$l_3$: length of an arm for installing an urging spring for the tension-detecting arm $l_4$: length of the arm from the center of rotation of the tension-detecting arm to the tape tension-detecting portion (dimension in the x direction between the support shaft 6 and the tape tension-detecting pin 7)

R: tape winding diameter $R_1$: outside diameter of a portion on the reel table for sliding the tension-applying band $\mu_1$: coefficient of friction between felt and the reel base $\theta$: angle of winding the tension-applying band onto the reel base $F_0$: initial tension of the urging spring for the tension-detecting arm $\alpha$: angle (RAD) formed by the magnetic tape by way of the tape tension-detecting pin $\beta$: angle (RAD) formed between the tension-detecting arm and the magnetic tape In addition, it is assumed that $$f(e^{\mu_1 \theta}) = \frac{e^{\mu_1 \theta}}{e^{\mu_1 \theta} - 1}.$$

In Formula (1), since the tape winding diameter R decreases from R to $R_0$ with the lapse of time, T also increases with time. In other words, the tape tension T increases upon completion of the winding of the magnetic tape, exerting an adverse effect on various aspects of the performance of the VTR, particularly on the head touch of the magnetic head.

In order to check the drift of this tape tension and to improve the tension-controlling characteristics, it suffices if the denominator of Formula (1) is made a large as possible. For this reason, the specifications of the parameters become as follows.

$\theta \rightarrow$ large; $l_1/l_2 \rightarrow$ large; $\alpha$-$\beta \rightarrow$ small; $l_4/l_2 \rightarrow$ small; and $$\left| \beta \frac{\pi}{2} \right|$$

$\rightarrow$ small. In other words, the angle at which the tape is wound onto the tape tension-detecting portion (the tape tension-detecting pin 7), the outside diameter of the tension band-applying portion on the reel base, the angle at which the tension band is wound, and the arm ratio should all be set at large values.

In addition, by conducting a simulation of variations of the values of tension drift by varying the aforementioned parameters, it was confirmed that the increase in the angle at which the magnetic tape is wound onto the tape tension-detecting portion, which is not liable to be subjected to restriction in terms of space, is particularly effective.

It is a further object of the invention to prevent contact between the magnetic tape wound in the cassette and the upper wall of the cassette at the cassette opening during loading of the tape onto a rotary cylinder. The path of travel of the tape changes in height during loading of the tape onto the rotary cylinder. As the tape emerges from the cassette opening, the upper edge of the tape is prevented from contacting the upper wall of the cassette by providing a pin or guide downstream of the cassette opening around which the tape travels. Between the pin or guide that is provided outside of the cassette opening and the opening itself, a change in height of the tape travel is controlled to prevent contact between the upper edge of the tape and the upper wall of the cassette opening, in the case of an upward loading of the tape. The pin or guide that establishes a path of travel of the tape that prevents contact between the cassette opening and the tape can be part of a tape-winding arm or tension detecting arm that pivots outwardly during a loading operation to carry the tape out of the cassette. Alternatively, a pin or guide can be positioned downstream from the cassette opening around which the tape travels to control its change in height.

It is an object of the invention to provide a compact tape-winding and tension detecting arm having a tape engaging guide or pin that moves from a position within the cassette opening to a position downstream of the cassette opening. The change in height of the tape from where it is unwound from the supply reel and drawn out of the cassette to the tape pin or guide of the tape-winding and tension controlling arm is controlled so that no contact occurs between the edge of the tape and an inside surface of a wall of the cassette at the opening.

BRIEF DESCRIPTION OF THE DRAWINGS

FIG. 4 is a diagram of time vs. tape tension in which the drift of tape tension is compared in terms of the presence and absence of the tape-winding arm;

FIGS. 5 (a-c) are a side-elevational views illustrating a change in the height of the magnetic tape during loading using the device shown in FIG. 1;

DESCRIPTION OF THE PREFERRED EMBODIMENTS

Description of an embodiment of the present invention will be made with reference to FIGS. 1 to 6.

Figure 1:
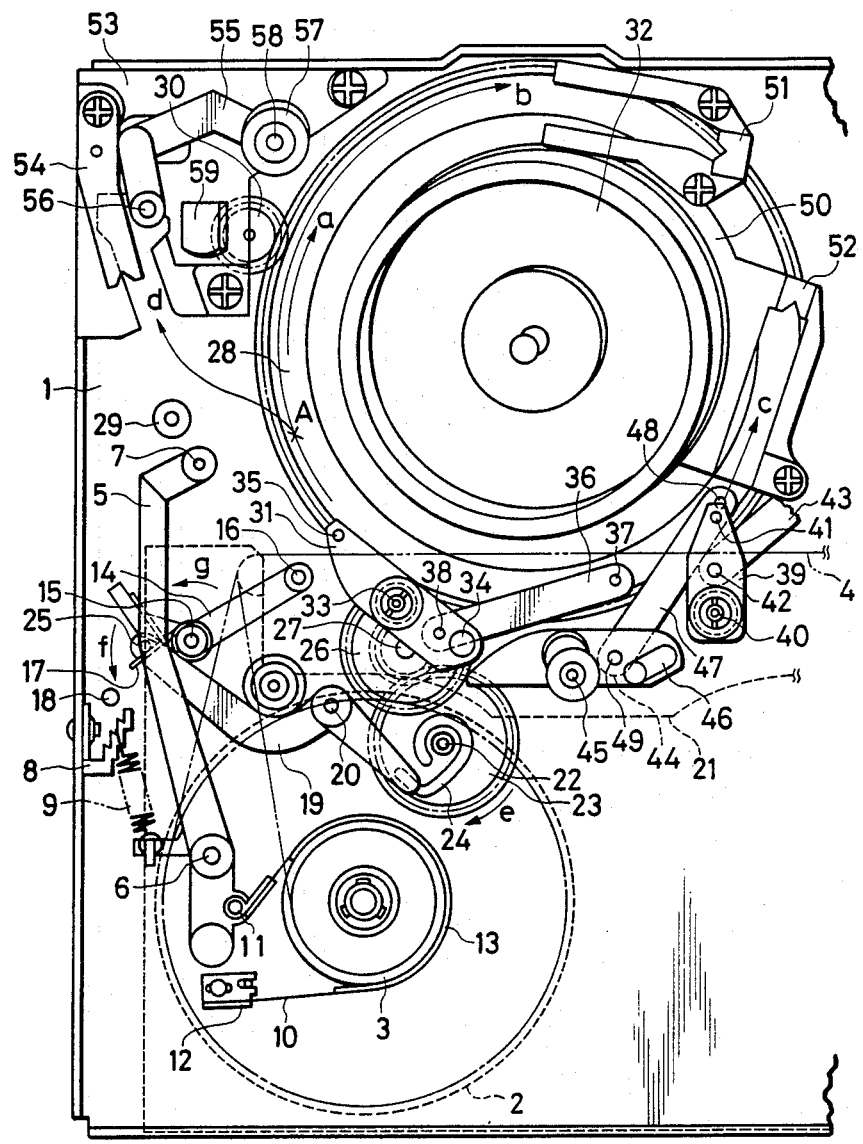
FIG. 1 is a plan view illustrating a state in which a tape tension-controlling apparatus for a magnetic recording and reproducing device according to one embodiment of the present invention is undergoing an unloading operation.

First, FIG. 1 is a plan view of a cassette unloading operation illustrating a tape tension-controlling device for a magnetic recording and reproducing apparatus construction in accordance with an embodiment of the present invention. The arrangement of the device will be described with reference to FIG. 1.

In FIG. 1, the following reference numerals denote: 1, a main chassis; 2, a supplying-side reel fixedly mounted on a reel base 3 and rotating integrally with the reel base 3; and 4, a magnetic tape paid out from the supply-side reel 2 and shown by a broken line of long and short dashes.

Reference numeral 5 denotes a tension-detecting arm having one end rotatably supported by a support shaft 6 provided on the main chassis 1, and having at the other end a tape tension-detecting pin 7 for abutting against the magnetic surface side of the magnetic tape 4. An urging force is applied to tension detecting arm 5 by a spring 9 whose one end is retained by a spring holder 8 that is secured to the main chassis 1, arm 5 is adapted to be displaced in response to variations in tape tension applied to the magnetic tape 4.

Reference numeral 10 denotes a tension-applying band. One end of this tension-applying band 10 is coupled with a support pin 11 provided on the tension-detecting arm 5, while the other end thereof is retained by a band holder 12 secured to the main chassis 1. A band portion in the intermediate portion thereof is wound around the reel base 3 in the shape of a letter U. This tension-applying band 10 adjusts the tightening force applied to the reel base 3 in response to the displacement of the tension-detecting arm 5.

Reference numeral 13 is a felt material, such as hard wool, which is adhered to the surface of the tension-applying band 10 which comes into contact with the reel base 3.

Reference numeral 14 is a tape-winding arm. One end of tape-winding arm 14 is rotatably supported by a support shaft 15 provided on the main chassis 1, and the other end has a tape-winding pin 16 relating to a tape guide means for abutting against the base surface side of the magnetic tape 4 at a position closer to the supplying-side reel 2 than the tape tension-detecting pin 7.

In addition, this tape-winding arm 14 is urged by a spring 17 in the direction of the magnetic tape 4.

Reference numeral 18 denotes a stopper for limiting the movement of tape-winding arm 14 to a predetermined angle, stopper 18 is secured to the main chassis 1.

Reference numeral 19 denotes a winding-controlling arm. This winding-controlling arm 19 is supported rotatably by a support shaft 20 provided on the main chassis and was at one end of the arm a control member for positioning the tape-winding arm 14 at a predetermined position within a cassette opening 21 (shown by a broken line) during unloading. In addition, the other end of the arm engages a cam mechanism 24 of a cam gear 23 for driving the winding-controlling arm, which is supported rotatably by a support shaft 22 provided on the main chassis 1. Accordingly, the winding-controlling arm 19 is adapted to rotate as the cam gear 23 rotates.

Reference numeral 25 denotes a control pin embedded at one end of the winding-controlling arm 19, which is connected with one end of the tape-winding arm 14 via the urging spring 17, and is adapted to move the tape-winding arm 14 in an interlinking relationship by the rotation of the winding-controlling arm 19.

Reference numeral 26 denotes a drive transmission gear supported rotatably by a support shaft 27 provided on the main chassis 1, while reference numeral 28 denotes a loading ring serving as a driving source.

The cam gear 23 rotates synchronously with the rotation of the loading ring 28, and the winding arm 14 is adapted to be loaded at a predetermined position.

Reference numeral 29 denotes a fixed guide embedded in the main chassis 1.

Reference numeral 30 denotes a drive gear for driving the loading ring 28, and the drive gear 30 is driven by a loading motor (not shown) via a suitable reduction gear.

Next, description will be made of the arrangement of a loading mechanism.

Reference numeral 31 denotes a first guide roller base located on the entrance side of a rotary cylinder 32; 33, a first guide roller embedded in the first guide roller base 31; 34, a first inclined pin; 35, a positioning pin; and 36, a leaf spring coupling the loading ring 28 and the first guide roller base 31. This leaf spring 36 couples a coupling portion 37 which is movable on the loading ring 28 in the circumferential direction via a spring (not shown) with a coupling portion 38 provided on the first guide roller base 31. These components constitute a first tape guide body.

Reference numeral 39 denotes a second guide roller base located on the exit side of the rotary cylinder 32; 40, a second guide roller embedded in the second guide roller base 39; 41, a positioning pin; 43, a coupling arm for moving the second guide roller base 39 via a suitable drive mechanism (not shown) synchronously with the rotation of the loading ring 28; and 42, a coupling portion thereof. These components constitute a second tape guide body.

Reference numeral 44 denotes a third guide roller base for drawing out the magnetic tape 4 to the entrance side of the rotary cylinder 32; 45, a third guide roller embedded in the third guide roller base 44; 46, a third inclined pin; 47, a leaf spring coupling the loading ring 28 with the third guide roller base 44, a coupling portion 48 thereof being coupled with the loading ring 28 by means of a compression ring (not shown); and 49, a coupling portion for coupling the third guide roller base 44 with the leaf spring 47. These components constitute a third tape guide body.

Reference numeral 50 denotes a cylinder base for securing and retaining the rotary cylinder 32. This cylinder base 50 is provided with a positioning portion 51 for the first guide roller base 31 and a positioning portion 52 for the second guide roller base 39. At the same time, the cylinder base 50 also serves as a guide for the rotation of the loading ring 28.

Reference numeral 53 denotes a positioning member for the third guide roller base 44; 54, a fixing member for fixing a head portion of the third guide roller 45; 55, an impedance roller arm supported rotatably by a support shaft 56 embedded in the positioning member 53; 57, an impedance roller supported rotatably by a support shaft embedded in the impedance roller arm 55; and 59, an overall tape width-erasing head secured to the positioning member 53.

Figure 2:
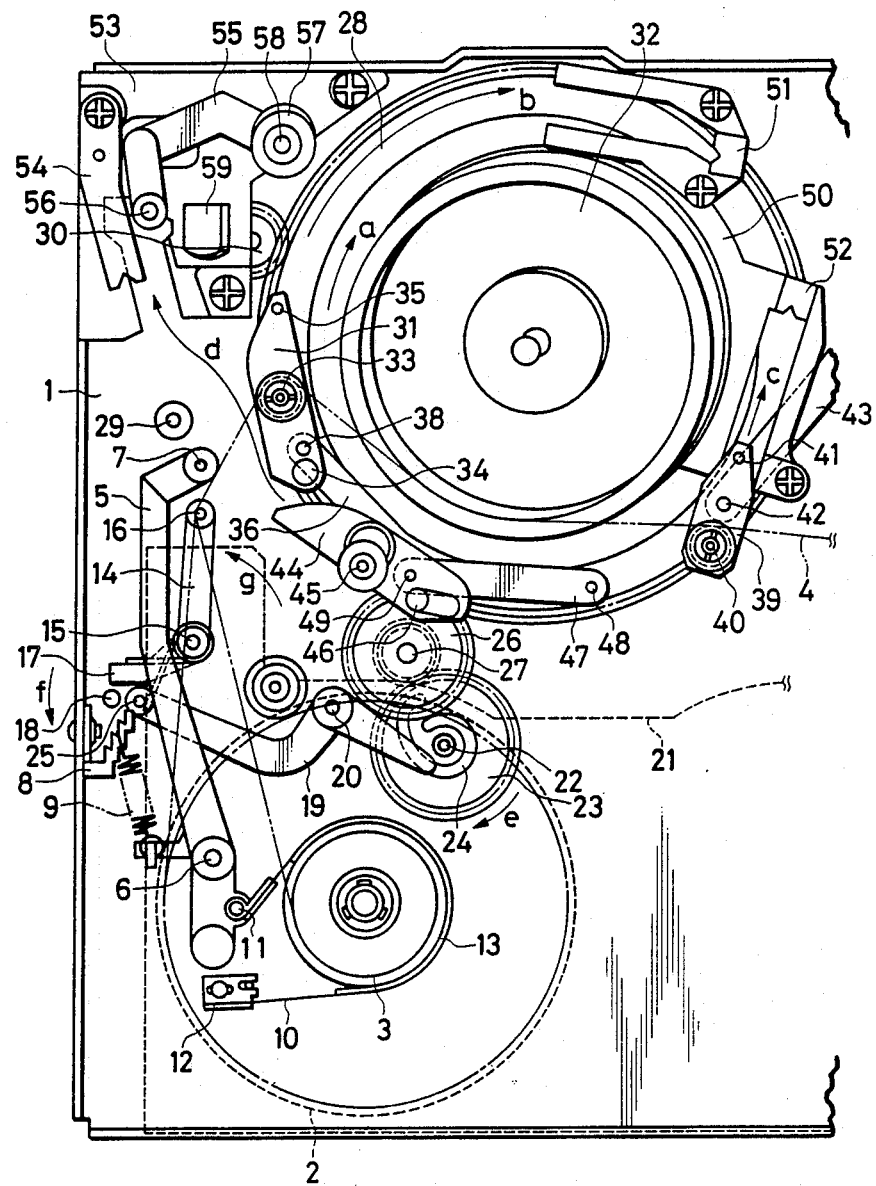
FIG. 2 is a plan view illustrating a state in which the loading of a tape-winding arm in the device shown in FIG. 1 has been completed.
Figure 3:
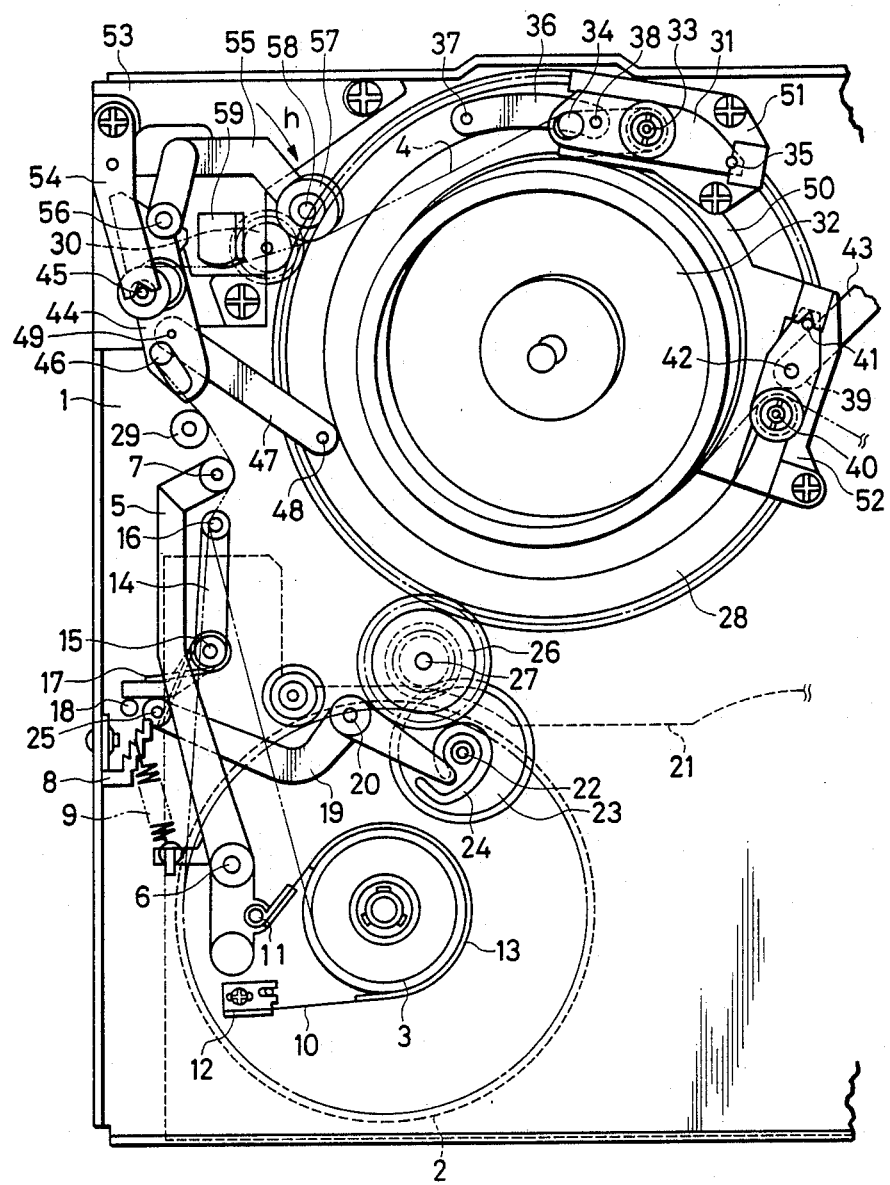
FIG. 3 is a plan view illustrating a state in which the loading of a magnetic tape onto a rotary cylinder has been completed.

Referring next to FIGS. 2 and 3 in addition to FIG. 1, description will be made of the operation of the tape tension-controlling device for a magnetic recording and reproducing apparatus thus constructed.

FIG. 2 is a plan view illustrating a state in which the loading of the tape-winding arm in the device shown in FIG. 1 has been completed, while FIG. 3 is a plan view illustrating a state in which the loading of the magnetic tape onto the rotary cylinder has been completed. In FIGS. 2 and 3, the same reference numerals as those employed in FIG. 1 are given to the same components.

It should be noted that the loading of the tape-winding arm 14 refers to an operation in which the tape-winding pin 16 of the tape-winding arm 14 draws out the magnetic tape and moves to the position shown in FIG. 2.

In addition, loading referred to simply herein means the mounting of the magnetic tape 4 onto the rotary cylinder 32 via the plurality of tape guide bodies.

First, FIG. 1 is a plan view illustrating the beginning of an unloading operation of the first embodiment of the tape recording and playback mechanism.

The tape-winding arm 14 and the first, second and third guide roller bases 31, 39, 44 constituting the tape guide bodies are accommodated in the cassette opening 21, as shown in FIG. 1. At this time, the winding-controlling arm 19 is engaged with an outermost-diameter cam groove. In addition, the other end of the winding-controlling arm 19 is in contact with one end of the tape-winding arm 14 by means of spring 17.

Next, if the magnetic recording and reproducing apparatus is turned ON and the cassette is inserted, the loading ring 28 rotates in the direction of an arrow a, and the first, second, and third guide roller bases 31, 39, 44 start moving in the directions of arrows b, c and d, respectively, so that the magnetic tape 4 is paid out.

FIG. 2 shows the condition of the mechanism upon completion of the loading of the tape-winding arm 14.

The rotation of the loading ring 28 in the direction of a causes the cam gear 23 to rotate in the direction of an arrow e via the drive transmission gear 26, which in turn rotates the winding-controlling arm 19 to pivot in the direction of an arrow f, which in turn pivots the tape-winding arm 14 in the direction of an arrow g by means of the urging force of the urging spring 17, thereby paying out the magnetic tape 4.

Furthermore, the winding-controlling arm 19 continues to pivot even after one end of the tape-winding arm 14 has been brought into contact with the stopper 18 and positioned. When a cam groove-engaging portion of the winding-controlling arm 19 has reached a minimum-diameter cam groove of the cam groove 24, the pivoting of the winding-controlling arm 19 stops. At this time, an urging force is applied to the tape-winding arm 14 in the pivoting direction g by means of the urging spring 17, and the tape winding-arm 14 is thereby secured.

At this juncture, the first, second, and third guide roller bases 31, 39, 44 move to the position shown in FIG. 2 along a guide groove of a guide plate (not shown). At this time, the first guide roller base 31 has been moved to a branching point A shown in FIG. 1.

At this point of time, there is no movement of the height of each of the loading members in the transverse direction of the magnetic tape, and the height of the magnetic tape 4 is restricted by the tape-winding arm 14 at a position close to the rotary cylinder 32.

Next, FIG. 3 shows a state in which loading is completed after the loading ring 28 has rotated, the first, second, and third guide roller bases 31, 39, 44 have moved along the guide groove of the guide plate (not shown), and positioning has been effected by the positioning portions 51, 52 and the positioning member 53 in position.

Here, a necessary pressing force is applied to each of the guide roller bases 31, 39, 44 by means of urging springs (not shown) in the appropriate position.

In addition, the impedance roller 57 is moved in the direction of h by another drive means (not shown) immediately after the passing of the first guide roller base 31, is positioned in a predetermined position, and forms a predetermined tape path shown by a broken line of long and short dashes. During movement of the tape guide bodies between the positions shown in FIGS. 2 and 3 respectively no influence is exerted on the tape-winding arm 14 since the radius of cam groove 24 of the cam gear 23 remains constant.

Thus, the magnetic tape 4 is wound around the rotary cylinder 32 at a predetermined angle (approximately 220 degrees), and the recording or reproduction of data signals is carried out in that state.

Since the tape tension-controlling operation here is identical with that of a conventional magnetic recording and reproducing apparatus, description of its operation will be omitted.

Figure 6:
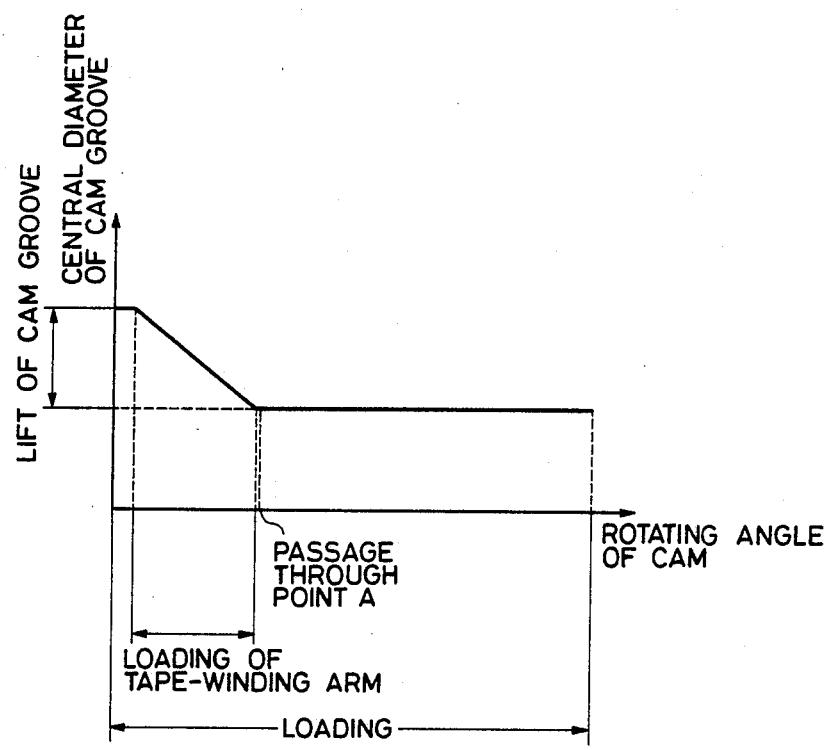
FIG. 6 is a diagram of angle vis-à-vis cam groove radius which shows the configuration of the cam groove of a cam gear.

Referring next to FIGS. 4 to 6, description will be made of variations of the tape height during a loading operation as well as the advantages of the present embodiment.

FIG. 4 is a diagram of time vs. tape tension in which the drift of tape tension is compared in terms of the presence and absence of the tape-winding arm. FIG. 5 is a side-elevational view illustrating changes in the height of the magnetic tape in the device shown in FIG. 1. FIG. 6 is a diagram of angle vs. cam groove radius which illustrates the configuration of the cam groove of the cam gear.

In this embodiment, the angle at which the magnetic tape 4 is wound onto the tape tension-detecting pin 7 becomes 68 degrees as a result of the provision of the tape-winding arm 14, said angle representing an increase of 31 degrees vis-à-vis 37 degrees obtained in a case where the tape-winding arm 14 is not provided. As a result of conducting a simulation, it was found that, as shown in FIG. 4, the tension drift value from the start of winding the tape up to the completion of the winding can be reduced by approximately 20% from 1.35 to 1.1 by the provision of the tape-winding arm 14.

FIG. 5 is a side elevational view illustrating a change in the height of the magnetic tape 4 during loading and a loading timing of the tape-winding arm 14, in which FIG. 5(a) shows an unloaded state; FIG. 5(b), a state of completion of the loading of the tape-winding arm 14, and FIG. 5(c), a state of completion of loading the magnetic tape 4 onto the rotary cylinder 32. Incidentally, the same components as those shown in FIG. 1 are designated by the same reference numerals.

The magnetic recording and reproducing apparatus in accordance with the present invention shown in FIG. 1 is so designed as to make the apparatus thin by winding the magnetic tape 4 onto the rotary cylinder 32 by a wide angle (220 degrees) and by reducing the angle of inclination of the magnetic tape 4 so as to make the rotary cylinder 32 upright as practically as possible. At a point of time the first guide roller base 31 on the entrance side of the rotary cylinder 32, after passing the branching point A, starts to be lifted along the guide plate (not shown), and, as shown in FIGS. 5(a) to 5(c), the position of its height changes by approximately the portion of the width of the magnetic tape 4.

Since the first guide roller base 31 completes the loading of the tape-winding arm 14 in the state shown in FIG. 5(b) before it starts to be lifted to the state shown in FIG. 5(c), it is possible to prevent damage to the tape in a portion B in the cassette opening 21, as shown in FIG. 5(c). In FIG. 5(c), the position of the magnetic tape indicated by an alternate long and two short dashed line shows a conventional state in which the tape-winding arm 14 is not provided and the magnetic tape comes into contact with a wall of the cassette opening 21. In contrast, in accordance with the present invention, the magnetic tape 4 assumes its position indicated by a solid line, so there is no possibility of the tape becoming damaged.

The loading timing of such a tape-winding arm 14 is realized by selecting a suitable configuration of the cam groove 24 in the cam gear 23, as mentioned earlier, and a configuration of the cam groove such as is shown in FIG. 6 is adopted in the present embodiment.

In FIG. 6, the angle of rotation of the cam during a loading time is taken as the axis of abscissa and the central diameter of the cam as the axis of the ordinate, and the Figure shows that the range of the left of the cam groove is determined in such a manner that the tape-winding arm completes the loading and positioning before passing through the point A.

According to the this first embodiment, since the tape-winding arm 14 is provided so that the angle at which the tape is wound around the tape tension-detecting portion, i.e., the tape tension-detecting pin 7, the tape tension drift from the start of winding of the magnetic tape 4 until the completion of winding can be reduced by approximately 20% in terms of a calculated value, thereby making it possible to improve the tape tension-controlling characteristics. In consequence, it becomes possible to improve the performance of a magnetic recording and reproducing apparatus in various aspects, such as the performance in terms of the jitter, wow, flutter, etc. of images.

In addition, since the tape drawing-out and positioning operations of the tape-winding arm 14 are completed before the height of the magnetic tape 4 being loaded undergoes the change, and the positioning of the magnetic tape 4 is carried out on the rotary cylinder 32 side rather than the cassette opening 21 side, the present invention has the advantage that the magnetic tape 4 can be prevented from becoming damaged as a result of coming into contact with an edge or the like of the tape draw-out portion of the cassette.

Figure 7:
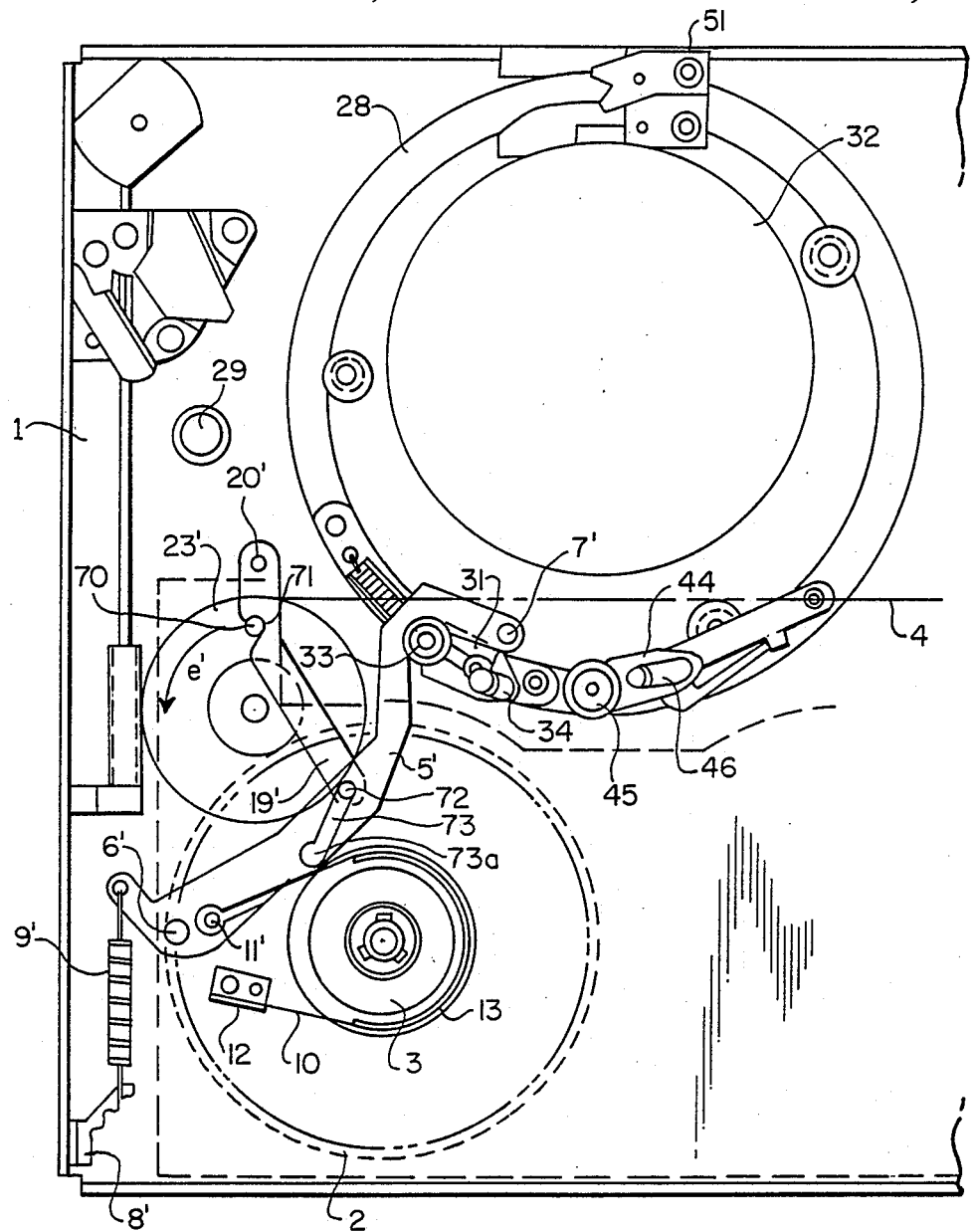
FIG. 7 is a plan view of a tape tension-controlling apparatus for a magnetic recording and reproducing device according to another embodiment of the present invention undergoing an unloading operation.
Figure 8:
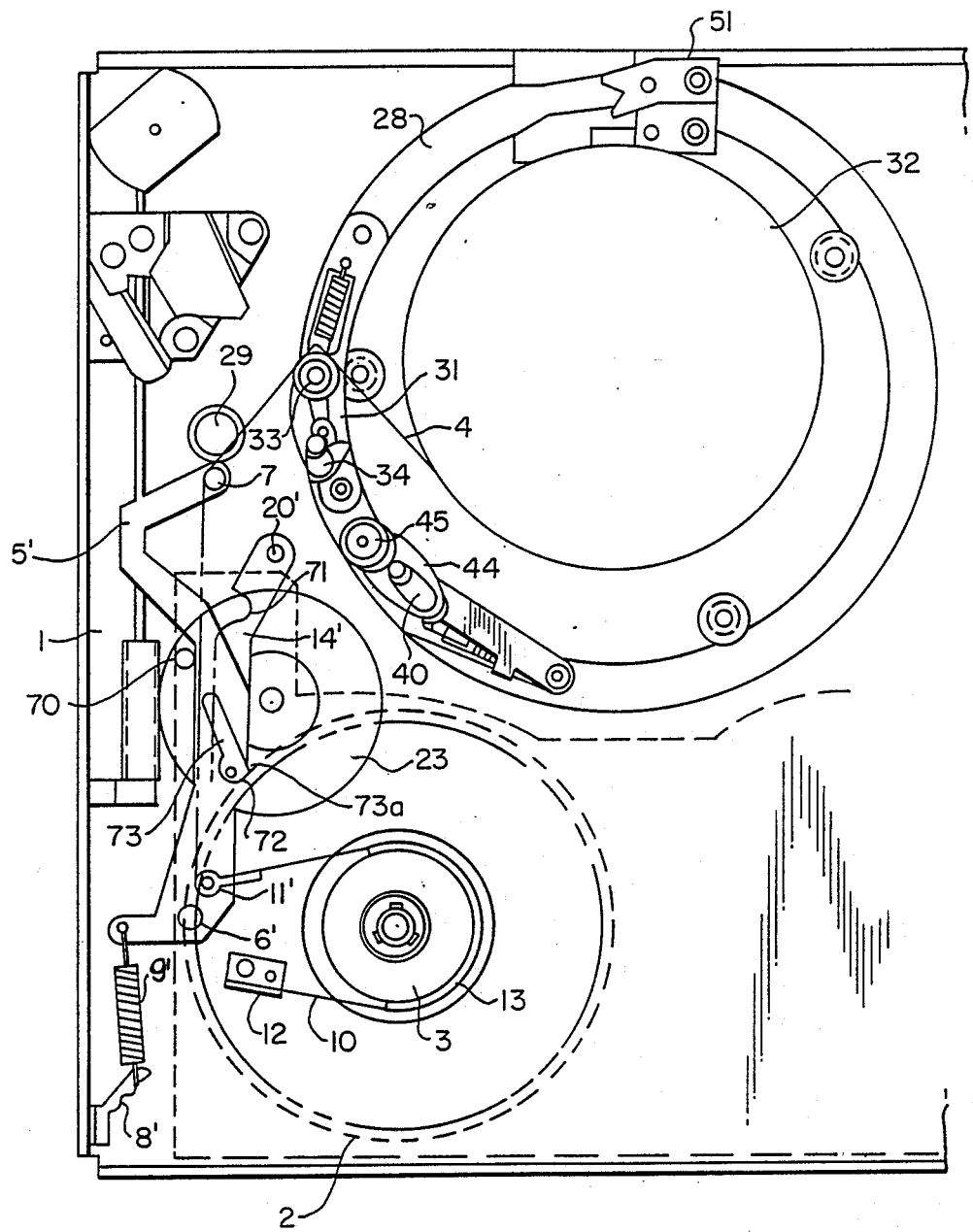
FIG. 8 is a plan view of the apparatus of FIG. 7 wherein loading of the tape-winding and tension detecting arm has been completed.

In another embodiment of the present invention, shown in FIGS. 7 and 8, the magnetic tape 4 is prevented from contacting the cassette opening when the tape is loaded onto a rotary cylinder. In FIG. 7, a plan view of the beginning of a tape loading operation is shown, and in FIG. 8 the loading of the tape onto the tape-winding and tension-controlling arm 5' has been completed. The components of the recording and playback apparatus shown in the embodiment of FIGS. 7 and 8 that are the same as those shown in FIGS. 1-3 of the preceding embodiment have been given like reference numerals such that a further explanation of these components with reference to FIGS. 7 and 8 is unnecessary.

In FIG. 7, loading of the tape onto the tape-winding and tension detecting arm 5' is shown. Arm 5' has a tension spring detecting pin 7' that engages tape 4 to pull it out from the opening of the cassette. Thus, the tape winding arm 14 of FIGS. 1-3 is not needed in the embodiment of FIGS. 7-8, because tension detecting arm 5' pivots outwardly from a position shown in FIG. 7 to the position shown in FIG. 8 thereby drawing the tape out of the cassette.

Tension detecting arm 5' is pivotally mounted to the chassis by a support shaft 6'. The arm is urged to rotate in a counterclockwise direction as shown in FIG. 7 by a spring 9' attached to an end of the tension detecting arm opposite tension detecting pin 7'. The other end of spring 9' is anchored to a holder 8' fixed to the chassis.

Movement of the tension detecting arm 5' between the positions shown in FIGS. 7 and 8 respectively is controlled by rotation of cam gear 23'. As the cam gear 23' rotates in the direction of arrow e', a pin or stop 70 that normally engages the winding and controlling arm 19' in a seat or notch 71 moves with cam 23' to allow the winding and controlling arm 19' to move into the position shown in FIG. 8. The winding and controlling arm 19' has a pin 72 that moves within a slot 73 formed in the tension detecting arm 5'. As a result of the force applied to the pivoted end of tension detecting arm 5' through spring 9', the tension detecting arm rotates outwardly with the pin 72 moving downwardly in slot 73 until the tension detecting arm comes to a position shown in FIG. 8 wherein pin 72 is positioned in a bulbous portion 73a of the slot. In moving from the position shown in FIG. 7 to the position shown in FIG. 8, the tension detecting arm 5' pulls tape 4 out of the cassette so that it may be loaded onto the rotary cylinder.

When the tension detecting arm 5' is in the position shown in FIG. 8, the tape 4 is wound partly around tension detecting pin 7' so that the tension in tape 4 can be detected when the arm is in this position. In an arrangement similar to that shown in the previous embodiment, the tension detecting band 10 is anchored in a band holder 12 fixed to the chassis at its one end, and held in a support 11' fixed to tension detecting arm 5' at its other end. In this way, tension in tape 4 is detected in arm 5' through pin 7' and the braking force applied through tension band 10 is controlled through small movements of the arm 5'. The bulbous portion 73a of slot 73 permits movement of arm 5', shown in FIG. 8, without interference from pin 72.

As a result of incorporating the function of tape winding arm 14 of the embodiment of the present invention as shown in FIGS. 1-3 into the tension detecting arm 5', the size of the tape unloading component of the apparatus is made more compact, and fewer parts are needed to attain the same results. In particular, the tape extends from supply reel 2 to the tension detecting pin 7' so that it does not contact the opening of the cassette. Downstream of the tension detecting in 7', the tape is wound upwardly onto the rotary cylinder. In the absence of the tension detecting pin 7', the tape would contact the upper wall of the cassette opening, in a manner similar to that shown with reference to FIGS. 5(A)-(C). Accordingly, in the second embodiment of the present invention, the tape tension is controlled, and the tape is pulled out of the cassette without contact between the tape and the cassette opening by the tape-winding and tension detecting arm 5'.

It should be noted that, although, in the aforementioned embodiments, description has been made of an example in which the magnetic tape on the entrance side of the rotary cylinder is lifted during loading, it goes without saying that the present invention can also be applied to a case where the magnetic tape on the entrance side of the rotary cylinder descends.

In addition, although description of a VTR has been made in the aforementioned embodiments, the present invention should not be restricted to the same, but can be applied in a versatile manner to a tape tension-controlling device for any magnetic recording and reproducing apparatus.

We claim:

1. A magnetic tape recording/reproducing apparatus adapted for receiving a tape cassette wherein the cassette has upper and lower walls and an opening for withdrawing the tape from the cassette, the upper and lower walls having inner surfaces adjacent the tape, and wherein the tape is contained on a supplying reel having a reel base supported for rotation between the walls, comprising:

a chassis and a head cylinder having a cylindrical wall mounted on said chassis for recording and/or reproducing signals on the tape, said cylinder wall having a tape path that changes the height of the tape transverse to the direction of travel of the tape as the tape travels around the cylinder wall;

tape loading means for withdrawing the tape from the cassette from the cassette opening and guiding the tape toward the head cylinder and for winding the tape onto the cylindrical wall so that an edge of the tape adjacent one of said upper and lower cassette walls is wound onto the cylindrical wall of the head cylinder at a point that differs in height from the corresponding inner surface of said one cassette wall; and means mounted on said chassis between the opening of the cassette and the head cylinder for preventing engagement of said edge of the tape with the inner surface of said one cassette wall.

2. A magnetic tape recording/reproducing apparatus as claimed in claim 1, further comprising:

said tape loading means including tape winding arm means having opposite ends, wherein one of said ends is mounted for rotation on said chassis and the other of said ends has a tape winding pin means for contacting the tape, said tape winding arm means for guiding the tape out of the cassette opening to a position wherein the tape winding arm supports the tape adjacent the cylindrical wall; and said tape winding arm means being said means for preventing engagement of said edge of the tape with the inner surface of said one cassette wall.

3. A magnetic tape recording and/or reproducing apparatus as claimed in claim 2, further comprising:

said tape winding arm means further for guiding the tape to a position wherein the tape winding pin means supports the tape adjacent the cylindrical wall such that the change in height of the tape from the supplying reel to the tape winding pin is upward relative to the supplying reel and less than a change in height wherein contact could occur between said edge of the tape and said inner surface of the upper cassette wall.

4. A magnetic tape recording and/or reproducing apparatus as claimed in claim 2, further comprising:

tape tension controlling means including a movable detecting arm having opposite ends, wherein one of said detecting arm ends is mounted for rotation to said chassis and the other of said ends has pin means for engaging the surface of the tape between the supplying reel and the head cylinder such that the detecting arm detects the tension in the tape and movement of the detecting arm is responsive to the change of tension of the tape, said tape tension controlling means further including braking means controlled by the movement of said detecting arm for resisting the rotation of said supplying reel with a braking force so as to maintain a substantially constant tension in said magnetic tape; and said tape winding arm means being mounted on said chassis between said tape engaging means of said detecting arm and said supplying reel, at a position closer to said supplying reel than said detecting arm.

5. A magnetic tape recording/reproducing apparatus having means for receiving a tape cassette wherein the cassette has upper and lower walls and an opening for withdrawing the tape from the cassette, the upper and lower walls having inner surfaces adjacent the tape, and wherein the tape is contained on a supplying reel having a reel base supported for rotation between the walls, comprising:

a chassis and a head cylinder having a cylindrical wall mounted on said chassis for recording and/or reproducing signals on the tape, said cylindrical wall having a tape path that changes the height of the tape transverse to the direction of travel of the tape as the tape travels around the cylindrical wall;

means for controlling the tape tension including tension detecting arm means mounted for rotation to said chassis at one end and having tension detecting pin means for engaging the surface of the tape at the other end, said tension detecting arm means for detecting the tension in the tape and moving in response to change of tension in the tape, said tape tension controlling means further including braking means controlled by the movement of said tension detecting arm means for resisting the rotation of said supplying reel with a braking force so as to maintain a substantially constant tension in said magnetic tape;

said tension detecting arm means further for withdrawing the tape out of the cassette wherein said tension detecting pin means is further for contacting the tape when the tape is contained within the cassette and for guiding the tape out of the opening of the cassette to a position wherein the tape is supported by said tape tension detecting pin means adjacent the cylindrical wall;

tape loading means for loading the tape that is withdrawn by said tape tension detecting arm means onto the cylindrical wall of the head cylinder so that an edge of the tape adjacent one of said upper and lower cassette walls is wound onto the cylindrical wall of the head cylinder at a point that differs in height from the corresponding inner surface of said one cassette wall; and said tape tension detecting arm means further for preventing engagement of said edge of the tape with the inner surface of said one cassette wall.

6. The magnetic tape recording/reproducing apparatus according to claim 5, wherein said means for loading the tape onto the cylindrical wall guides the tape through the change in height upwardly relative to said supplying reel so that the tape contacts the cylindrical wall at a point higher than the inner surface of said upper wall of the cassette.

7. The magnetic tape recording/reproducing apparatus according to claim 5, further comprising:

said tape tension detecting arm means having biasing means for applying a force that causes rotation of said tension detecting arm means in a direction to withdraw the tape out of the cassette opening, said biasing means further for applying a rotational force at one end of the tape tension detecting arm means to balance the force of the tension in the tape acting on said tension detecting pin means when said tape tension detecting arm means is in a position wherein the tape winding arm supports the tape adjacent the cylindrical wall of the head cylinder.

* * * * *